(12) United States Patent
Bouton

(10) Patent No.: US 11,132,492 B2
(45) Date of Patent: Sep. 28, 2021

(54) METHODS FOR AUTOMATED FILLING OF COLUMNS IN SPREADSHEETS

(71) Applicant: Vyasa Analytics, LLC, Newburyport, MA (US)

(72) Inventor: Christopher M L Bouton, Newburyport, MA (US)

(73) Assignee: VYASA ANALYTICS, LLC, Newburyport, MA (US)

( * ) Notice: Subject to any disclaimer, the term of this patent is extended or adjusted under 35 U.S.C. 154(b) by 0 days.

(21) Appl. No.: 17/064,230

(22) Filed: Oct. 6, 2020

(65) Prior Publication Data

US 2021/0103694 A1 Apr. 8, 2021

Related U.S. Application Data

(60) Provisional application No. 62/911,878, filed on Oct. 7, 2019.

(51) Int. Cl.
| | | |
|---|---|---|
| *G06F 40/103* | (2020.01) | |
| *G06F 40/183* | (2020.01) | |
| *G06F 40/177* | (2020.01) | |
| *G06F 16/22* | (2019.01) | |
| *G06F 16/2452* | (2019.01) | |
| *G06N 3/08* | (2006.01) | |

(52) U.S. Cl.
CPC ......... *G06F 40/103* (2020.01); *G06F 16/221* (2019.01); *G06F 16/2282* (2019.01); *G06F 16/24522* (2019.01); *G06F 40/177* (2020.01); *G06F 40/183* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 10,902,194 B2* | 1/2021 | Toronto | G06F 40/18 |
| 2006/0173834 A1* | 8/2006 | Brill | G06F 16/248 |
| 2007/0118548 A1* | 5/2007 | Carapella | G06F 16/90328 |
| 2007/0250765 A1* | 10/2007 | Chen | G06F 3/0237 715/234 |
| 2013/0191714 A1* | 7/2013 | Rothschiller | G06F 40/174 715/226 |
| 2015/0169737 A1* | 6/2015 | Byron | G06F 40/177 707/758 |
| 2015/0309990 A1* | 10/2015 | Allen | G06F 16/245 704/9 |
| 2016/0267117 A1* | 9/2016 | Guggilla | G06F 16/2455 |
| 2016/0275066 A1* | 9/2016 | Otero | G06F 9/453 |
| 2017/0177559 A1* | 6/2017 | Dang | G06Q 30/0201 |
| 2018/0157990 A1* | 6/2018 | Allen | G06F 16/9535 |
| 2018/0203924 A1* | 7/2018 | Agrawal | G06F 16/3326 |
| 2018/0349359 A1* | 12/2018 | McCann | G06N 3/0454 |
| 2018/0373712 A1* | 12/2018 | McCrory | G06F 16/13 |
| 2018/0375805 A1* | 12/2018 | Sethi | G06F 16/437 |
| 2019/0340240 A1* | 11/2019 | Duta | G06F 40/177 |

(Continued)

*Primary Examiner* — Howard Cortes
(74) *Attorney, Agent, or Firm* — William R. Haulbrook; Samuel R. Polio; Choate, Hall & Stewart LLP

(57) ABSTRACT

Presented herein are systems and methods for populating electronic documents, and, in particular, automatically filling columns in a spreadsheet, using a machine learning module. In certain embodiments, the machine learning module comprises natural language processing (NLP) software, for example, Question Answer (QA) software.

11 Claims, 3 Drawing Sheets

(56) References Cited

U.S. PATENT DOCUMENTS

| | | | |
|---|---|---|---|
| 2020/0104414 A1* | 4/2020 | Filoti | G06F 16/2282 |
| 2020/0250715 A1* | 8/2020 | Mustafi | G06Q 30/0282 |
| 2021/0026898 A1* | 1/2021 | Khillar | G06F 40/211 |
| 2021/0042307 A1* | 2/2021 | Mustafi | G06K 9/00469 |
| 2021/0042308 A1* | 2/2021 | Mustafi | G06F 7/00 |
| 2021/0042309 A1* | 2/2021 | Mustafi | G06F 16/258 |
| 2021/0103694 A1* | 4/2021 | Bouton | G06F 16/24522 |

* cited by examiner

METHODS FOR AUTOMATED FILLING OF COLUMNS IN SPREADSHEETS

CROSS-REFERENCE

This application claims the benefit of and priority to U.S. Provisional App. No. 62/911,878 filed on Oct. 7, 2019, the contents of which are hereby incorporated by reference in their entirety.

FIELD

The subject matter described herein relates to systems and methods for populating electronic documents, and, in particular, the automated addition of data (e.g., rows and/or columns) in a spreadsheet, e.g., using natural language processing (NLP) software.

BACKGROUND

Spreadsheets are an essential form of modern digital information handling. Information can be added to spreadsheets by "joining" of tabular data in the spreadsheet with other tabular data, or by laborious, piecemeal addition of data.

Macros are a set of stored functions that can be used to automate the filling of cells of a spreadsheet according to a defining formula. Existing commercial software enables the use of macros to automate particular tasks across electronic worksheets and workbooks. Macro-enabled spreadsheet software generally allows a user to define a simple formula for computing a result to insert in a given cell, based on other identified cells of the spreadsheet. For example, a user may define a macro to compute a total of an identified column of values and insert that total in a cell beneath the column. When the user edits a value in the column, the macro automatically updates the total.

Recent "deep learning" algorithms have enabled sophisticated "question answer" capabilities through training on large-scale unstructured document corpora. These "QA" systems have been recently used in chatbots and digital assistants (e.g., Alexa, Siri) to answer questions for end users. Here, the user asks one question at a time and then receives an answer.

SUMMARY OF THE INVENTION

Presented herein are systems, methods, and architectures related to populating electronic documents, and, in particular, automatically filling columns in a spreadsheet, using a machine learning module. In certain embodiments, the machine learning module comprises natural language processing (NLP) software, for example, Question Answer (QA) software.

For example, presented herein is a user interface referenced below as "smart columns," which appear in spreadsheets referenced herein as "smart tables." Instead of defining output according to a formula based on input variables gathered from other cells of the spreadsheet, as with macro-enabled spreadsheet software, smart tables define a series of unique (albeit patterned) questions for which answers are found (e.g., using NLP software) to fill corresponding cells of smart columns. Each question contains one or more variables culled from one or more adjacent columns.

In one aspect, the invention is directed to a method for automatically populating entries in a table, the method comprising: receiving, by a processor of a computing device, a template question for populating a 'smart column' of the table, said smart column comprising a plurality of rows, said template question comprising one or more variables, each of said one or more variables corresponding to a 'variable column' (a column other than the smart column) containing a plurality of instantiations of said variable, each instantiation listed in a separate row; automatically identifying, by the processor, one or more alphanumeric (e.g., textual) responses to each of a plurality of instantiations of said template question, each instantiation comprising values of said one or more variables input from a corresponding row of the corresponding variable column, wherein said identifying is performed using (i) a machine learning module and, optionally, (ii) one or more associated datasets; and populating, by the processor, a cell in each row of the smart column with the one or more alphanumeric responses corresponding to the instantiation of the template question for that row.

In certain embodiments, the method comprises automatically updating a smart column upon editing (e.g., by a user) of an entry in a variable column by identifying, by the processor, an updated response to an instantiation of a template question with an updated variable according to the edited entry in the variable column and populating, by the processor, a cell in the smart column corresponding to the edited entry in the variable column (e.g., a cell in the smart column in the same row as the edited entry). For example, the method may include automatically updating the smart column when the user changes a value in the variable column.

In certain embodiments, the cell in the smart column is a cell in the smart column in the same row as the edited entry.

In certain embodiments, the table comprises at least first and second smart columns, wherein the first smart column serves as a variable column for the second smart column. For example, the smart table may include an automatically-generated smart column that serves as a variable column for another smart column in the table.

In certain embodiments, the machine learning module comprises natural language processing (NLP) software and/or architectures.

In certain embodiments, the machine learning module comprises NLP software and the NLP software comprises BERT (Bidirectional Encoder Representations from Transformers) and/or Question Answer software (e.g., IR-based factoid Question Answering, knowledge-based Question Answering, and/or multiple source Question Answering (e.g., IBM's Watson)).

In certain embodiments, said automatically identifying is performed using one or more associated datasets and wherein the one or more associated datasets comprise one or more of the following: Stanford Question Answering Dataset (SQuAD), WikiQA dataset, TREC QA dataset, and News QA dataset.

In another aspect, the invention is directed to a system for automatically populating entries in a table, the system comprising: a processor, and a memory having instructions thereon, the instructions, when executed by the processor, causing the processor to: receive a template question for populating a 'smart column' of the table, said smart column comprising a plurality of rows, said template question comprising one or more variables, each of said one or more variables corresponding to a 'variable column' (a column other than the smart column) containing a plurality of instantiations of said variable, each instantiation listed in a separate row; automatically identify one or more alphanumeric (e.g., textual) responses to each of a plurality of instantiations of said template question, each instantiation comprising values of said one or more variables input from a corresponding row of the corresponding variable column, wherein said identifying is performed using (i) a machine learning module and, optionally, (ii) one or more associated datasets; and populate a cell in each row of the smart column with the one or more alphanumeric responses corresponding to the instantiation of the template question for that row.

In certain embodiments, the machine learning module comprises natural language processing (NLP) software.

In certain embodiments, the NLP software comprises BERT (Bidirectional Encoder Representations from Transformers) and/or Question Answer software (e.g., IR-based factoid Question Answering, knowledge-based Question Answering, and/or multiple source Question Answering (e.g., IBM's Watson)).

In certain embodiments the instructions, when executed by the processor, cause the processor to automatically identify the one or more alphanumeric responses using one or more associated datasets, wherein the one or more associated datasets comprise one or more of the following: Stanford Question Answering Dataset (SQuAD), WikiQA dataset, TREC QA dataset, and News QA dataset.

In certain embodiments, the instructions, when executed by the processor, cause the processor to automatically update a smart column upon editing (e.g., by a user) of an entry in a variable column by identifying an updated response to an instantiation of a template question with an updated variable according to the edited entry in the variable column and populate a cell in the smart column corresponding to the edited entry in the variable column (e.g., a cell in the smart column in the same row as the edited entry).

In certain embodiments, the table comprises at least first and second smart columns, wherein the first smart column serves as a variable column for the second smart column. For example, the smart table may include an automatically-generated smart column that serves as a variable column for another smart column in the table.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
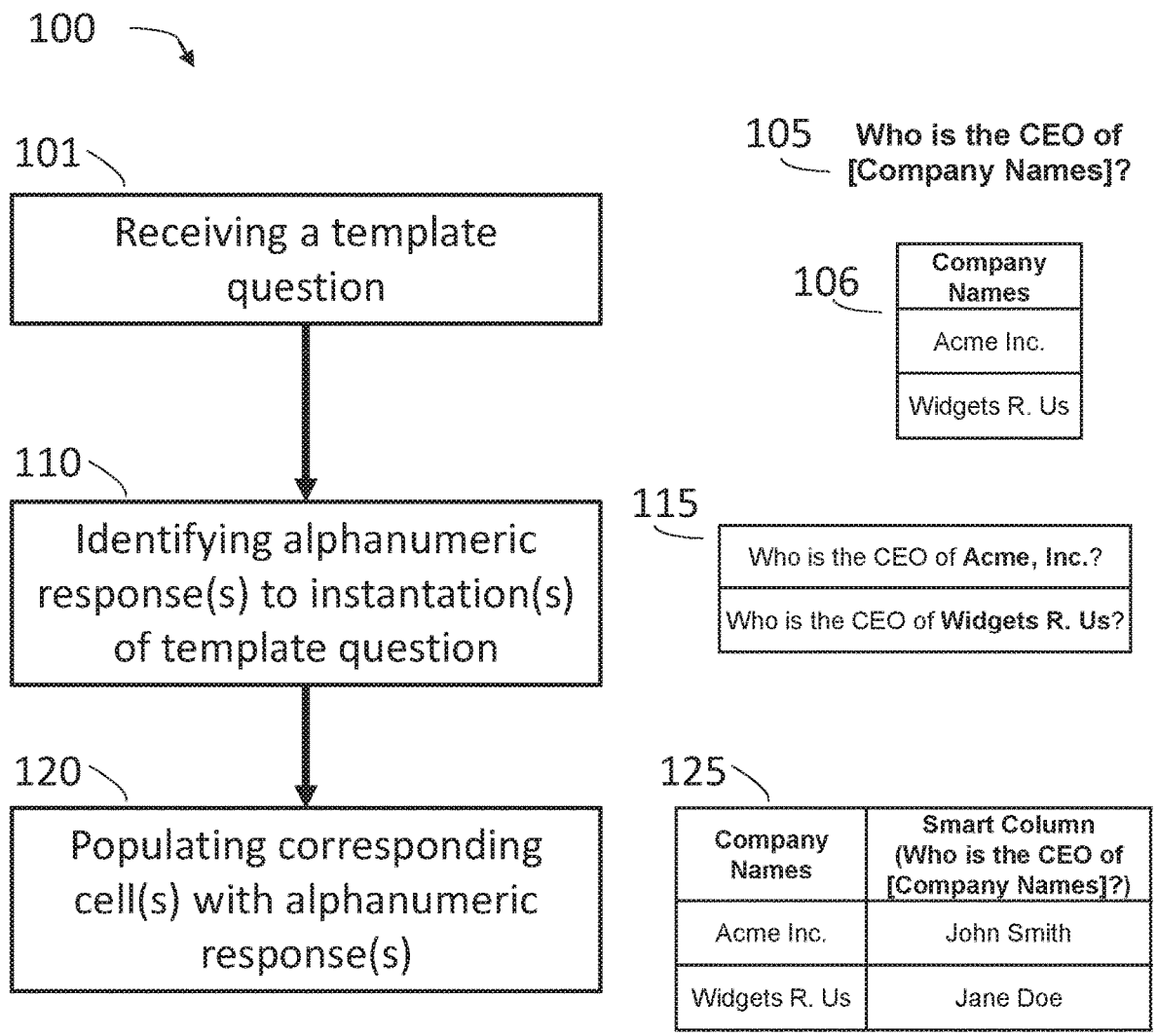
FIG. 1 is a block diagram showing an exemplary method for automatically populating entries in a table, according to an illustrative embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Headers are provided for the convenience of the reader—the presence and/or placement of a header is not intended to limit the scope of the subject matter described herein.

Example 1: Filling a Smart Column with Many Answers Based on a Template Question Filled with Variable Terms Derived from an Adjacent Column Presented herein is a user interface that enables the use of deep learning based QA capabilities to, instead of answering one question at a time, answer numerous instances of a given questions, where each question is filled with a variable from a proximal column in the spreadsheet. As illustrated in Table 1 below, a template question is used to define the smart column where a variable defined by square brackets (e.g., [X]) is used to populate each cell in the smart column with a new question formed from the template question and the variable term from the alternative column. For example, "Who is the CEO of [Company Names]?" will fill each cell with the values from the Company Names column. Answers for each of the newly formed questions are automatically retrieved via the NLP software based on the input question. One or more associated datasets may be used, for example, Stanford Question Answering Dataset (SQuAD), WikiQA dataset, TREC-QA dataset, and/or NewsQA dataset.

TABLE 1

| Company Names | Smart Column (Who is the CEO of [Company Names]?) |
|---|---|
| Acme Inc. | Who is the CEO of Acme, Inc.? (Cell is filled with answers found) |
| Widgets R. Us | Who is the CEO of Widgets R. Us? (Cell is filled with answers found) |
| XYZ Systems | Who is the CEO of XYZ Systems? (Cell is filled with answers found) |
| ABC Firm | Who is the CEO of ABC Firm? (Cell is filled with answers found) |

Correspondingly, FIG. 1 shows a block flow diagram illustrating a method (100) for automatically populating entries in a table, according to an illustrative embodiment. In step 101, a processor receives a template question for populating a Smart Column of the table. In the example, the question received (105) is "Who is the CEO of [Company Name]?" "Company Names" is a variable corresponding to a variable column (106) identified as [Company Names], each cell of which contains a company name. There are no particular limitations on the number of variables in the [Company Names] column.

In step 110, a processor automatically identifies one or more alphanumeric (e.g., textual) responses to each instance of the question. In FIG. 1, there are two company names listed in a variable column (106) and, correspondingly, two instances (115) of the question "Who is the CEO of [Company Name]?"

A processor then automatically identifies one or more answers to each instance of the question using a machine learning module and, optionally one or more associated data sets. For example, a machine learning module receives, as input, the question "Who is the CEO of Acme, Inc.?". A machine learning module then determines answer to the question. This process is repeated for each question. In certain embodiments, a machine learning module automatically obtains answers using a dataset, such as those described herein.

In step 120, cells are populated with responses (e.g., alphanumeric responses) corresponding to identified answers of questions. For example in FIG. 1, in each of cell of the Smart Column, an answer to a corresponding question is found using a template question and a corresponding variable. In the current example of FIG. 1, at 125 a Smart Column would provide answers to the questions, "Who is the CEO of Acme, Inc.?" and "Who is the CEO of Widgets R. Us?" in separate cells of the Smart Column. In FIG. 1 John Smith was an answer found to the question "Who is the CEO of Acme, Inc.?", while Jane Doe was an answer found to the question "Who is the CEO of Widgets R. Us?".

Smart Column Template Questions can be Defined with Multiple Variables from Multiple Alternative Columns in the Spreadsheet The user can define a template question with variables from multiple alternative columns (variable columns) in the spreadsheet. For example, the template question in Table 2 is written as follows: "Where does [Column 1] produce the [Column 2]?"

TABLE 2

| Company Names | Product Names | Smart Column (Where does [Company Names] produce the [Product Names]?) |
|---|---|---|
| Acme Inc. | Widget A | Where does Acme Inc. produce the Widget A? (Cell is filled with answers found) |
| Widgets R Us | Widget B | Where does Widgets R Us produce the Widget B? (Cell is filled with answers found) |
| XYZ Systems | Widget C | Where does XYZ Systems produce the Widget C? (Cell is filled with answers found) |
| ABC Firm | Widget D | Where does ABC Firm produce the Widget D? (Cell is filled with answers found) |

Example 2: Filling a Smart Column with a Single Question that May have Many Answers In addition to the use of QA for the sake of answering many questions, each with a different variable from an adjacent column, QA can be used to fill an empty column with many answers to a given static question. For example, in Table 3, the following question appears: "Which companies produce batteries?" There are no variables in this question-defining Smart Column, but multiple answers to the question are expected and thus each answer can be used to fill a separate cell/row in the Smart Column. These answers, in turn, can serve as variables in other Smart Columns.

TABLE 3

Figure 2:
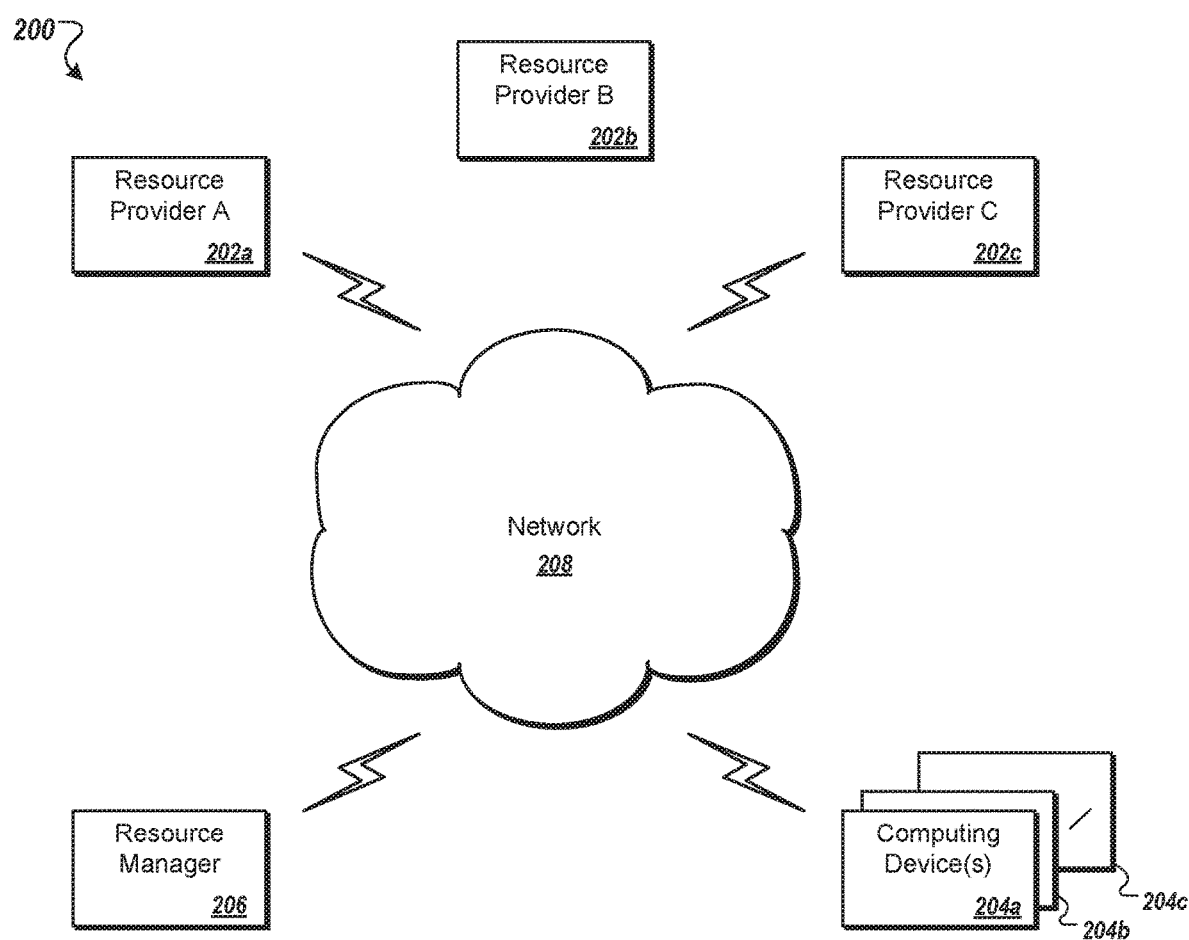
FIG. 2 is a block diagram of an exemplary cloud computing environment, used in certain embodiments.

Smart Column
("Which companies produce batteries?")
Acme Batteries Inc.
Batteries R. US
XYZ Battery System
ABC Batteries Network Environment and Computing Devices for Use in Various Embodiments As shown in FIG. 2, an implementation of a network environment 200 for use in providing systems, methods, and architectures as described herein is shown and described. In brief overview, referring now to FIG. 2, a block diagram of an exemplary cloud computing environment 200 is shown and described. The cloud computing environment 200 may include one or more resource providers 202a, 202b, 202c (collectively, 202). Each resource provider 202 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 202 may be connected to any other resource provider 202 in the cloud computing environment 200. In some implementations, the resource providers 202 may be connected over a computer network 208. Each resource provider 202 may be connected to one or more computing device 204a, 204b, 204c (collectively, 204), over the computer network 208.

The cloud computing environment 200 may include a resource manager 206. The resource manager 206 may be connected to the resource providers 202 and the computing devices 204 over the computer network 208. In some implementations, the resource manager 206 may facilitate the provision of computing resources by one or more resource providers 202 to one or more computing devices 204. The resource manager 206 may receive a request for a computing resource from a particular computing device 204. The resource manager 206 may identify one or more resource providers 202 capable of providing the computing resource requested by the computing device 204. The resource manager 206 may select a resource provider 202 to provide the computing resource. The resource manager 206 may facilitate a connection between the resource provider 202 and a particular computing device 204. In some implementations, the resource manager 206 may establish a connection between a particular resource provider 202 and a particular computing device 204. In some implementations, the resource manager 206 may redirect a particular computing device 204 to a particular resource provider 202 with the requested computing resource.

Figure 3:
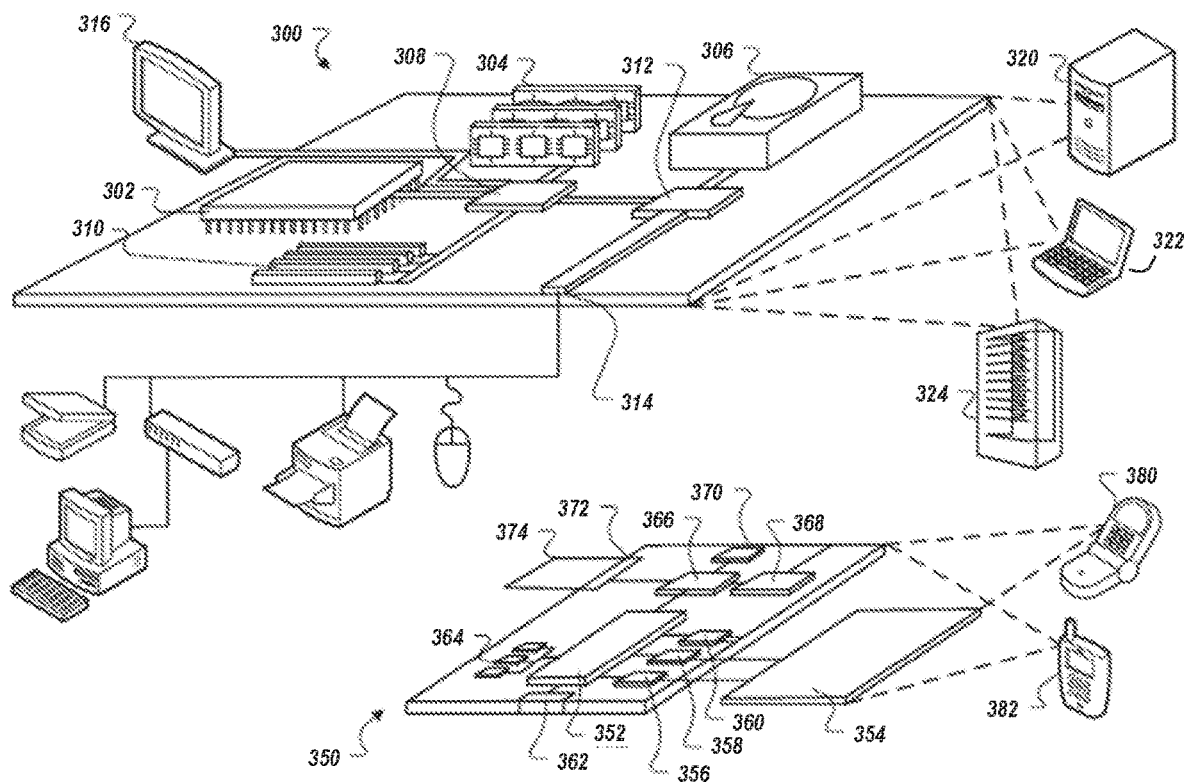
FIG. 3 is a block diagram of an example computing device and an example mobile computing device used in certain embodiments.

FIG. 3 shows an example of a computing device 300 and a mobile computing device 350 that can be used to implement the techniques described in this disclosure. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth®, Wi-Fi™, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

In certain embodiments, the computer programs comprise one or more machine learning modules. As used herein, a machine learning module refers to a computer implemented process (e.g., function) that implements one or more specific machine learning algorithms. The machine learning module may include, for example, one or more artificial neural networks (ANNs). In certain embodiments, two or more machine learning modules may be combined and implemented as a single module and/or a single software application. In certain embodiments, two or more machine learning modules may also be implemented separately, e.g., as separate software applications. A machine learning module may be software and/or hardware. For example, a machine learning module may be implemented entirely as software, or certain functions of a CNN (convolutional neural network) module may be carried out via specialized hardware (e.g., via an application specific integrated circuit (ASIC).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Elements of different implementations described herein may be combined to form other implementations not specifically set forth above. Elements may be left out of the processes, computer programs, databases, etc. described herein without adversely affecting their operation. Various separate elements may be combined into one or more individual elements to perform the functions described herein.

It is contemplated that systems, architectures, devices, methods, and processes of the claimed invention encompass variations and adaptations developed using information from the embodiments described herein. Adaptation and/or modification of the systems, architectures, devices, methods, and processes described herein may be performed, as contemplated by this description.

What is claimed is:

1. A method for automatically populating entries in a table, the method comprising:
   receiving, by a processor of a computing device, a template question for populating a smart column of the table, said smart column comprising a plurality of rows, said template question comprising one or more variables, each of said one or more variables corresponding to a variable column containing a plurality of instantiations of said variable, each instantiation listed in a separate row, wherein said variable column is a column other than the smart column;
   automatically identifying, by the processor, one or more alphanumeric responses to each of a plurality of instantiations of said template question, each instantiation comprising values of said one or more variables input from a corresponding row of the corresponding variable column, wherein said identifying is performed using a machine learning module;
   populating, by the processor, a cell in each row of the smart column with the one or more alphanumeric responses corresponding to the instantiation of the template question for that row; and
   automatically updating said smart column upon editing of an entry in the variable column by identifying, by the processor, an updated response to the instantiation of the template question with an updated variable according to the edited entry in the variable column and populating, by the processor, a cell in the smart column corresponding to the edited entry in the variable column.

2. The method of claim 1, wherein the cell in the smart column is in the same row as the edited entry.

3. The method of claim 1, wherein the table comprises at least a first smart column and a second smart column, and wherein the method comprises populating, by the processor, the first smart column with one or more alphanumeric responses and wherein the alphanumeric responses of the first smart column serve as variables for the second smart column.

4. The method claim 1, wherein the machine learning module comprises natural language processing (NLP) software and/or architectures.

5. The method of claim 4, wherein the machine learning module comprises NLP software and the NLP software comprises BERT (Bidirectional Encoder Representations from Transformers) and/or Question Answer software.

6. The method claim 1, wherein said automatically identifying is performed using one or more associated datasets and wherein the one or more associated datasets comprise one or more of the following: Stanford Question Answering Dataset (SQuAD), WikiQA dataset, TREC QA dataset, and News QA dataset.

7. A system for automatically populating entries in a table, the system comprising:
   a processor; and
   a memory having instructions thereon, the instructions, when executed by the processor, causing the processor to:
   receive a template question for populating a smart column of the table, said smart column comprising a plurality of rows, said template question comprising one or more variables, each of said one or more variables corresponding to a variable column containing a plurality of instantiations of said variable, each instantiation listed in a separate row, wherein said variable column is a column other than the smart column;
   automatically identify one or more alphanumeric responses to each of a plurality of instantiations of said template question, each instantiation comprising values of said one or more variables input from a corresponding row of the corresponding variable column, wherein said identifying is performed using (i) a machine learning module and, optionally, (ii) one or more associated datasets;
   populate a cell in each row of the smart column with the one or more alphanumeric responses corresponding to the instantiation of the template question for that row; and
   automatically update said smart column upon editing of an entry in the variable column by identifying an updated response to the instantiation of the template question with an updated variable according to the edited entry in the variable column and populating a cell in the smart column corresponding to the edited entry in the variable column.

8. The system of claim 7, wherein the machine learning module comprises natural language processing (NLP) software.

9. The system of claim 8, wherein the NLP software comprises BERT (Bidirectional Encoder Representations from Transformers), and/or Question Answer software.

10. The system of claim 7, wherein the instructions, when executed by the processor, cause the processor to automatically identify the one or more alphanumeric responses using one or more associated datasets, wherein the one or more associated datasets comprise one or more of the following: Stanford Question Answering Dataset (SQuAD), WikiQA dataset, TREC QA dataset, and News QA dataset.

11. The system of claim 7, wherein the cell in the smart column is in the same row as the edited entry.

* * * * *